Nov. 27, 1945.  L. M. SWIFT  2,389,828
RECORDER
Filed Feb. 24, 1942   5 Sheets-Sheet 1

Inventor
Lawrence M. Swift
By Stevens and Davis
Attorneys

Nov. 27, 1945.    L. M. SWIFT    2,389,828
RECORDER
Filed Feb. 24, 1942    5 Sheets-Sheet 2

Inventor
Lawrence M. Swift
By Stevens & Davis
Attorneys

Nov. 27, 1945  L. M. SWIFT  2,389,828
RECORDER
Filed Feb. 24, 1942  5 Sheets—Sheet 4

Inventor
Lawrence M. Swift
By Stevens & Davis
Attorneys

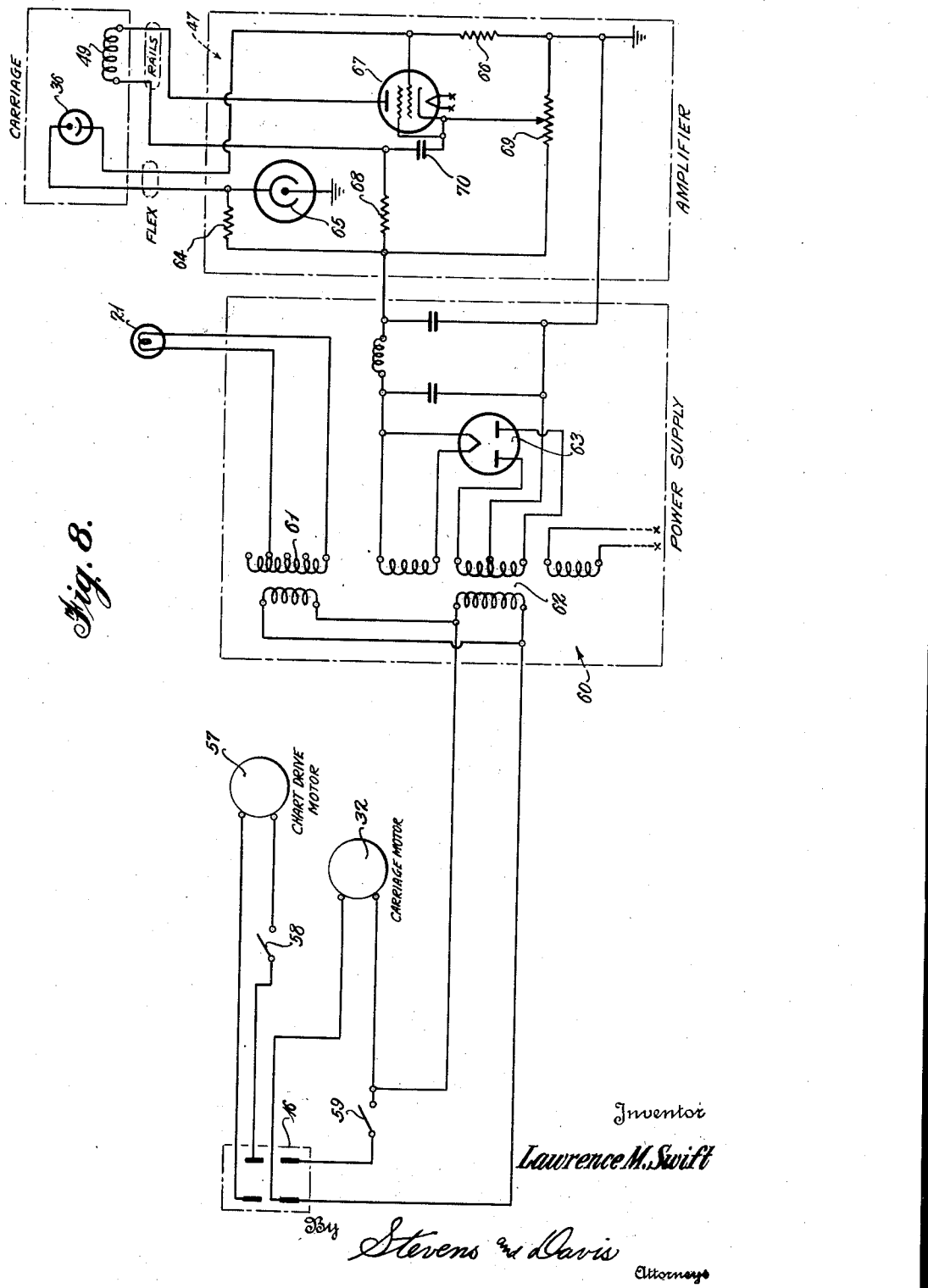

Patented Nov. 27, 1945

2,389,828

UNITED STATES PATENT OFFICE 2,389,828

RECORDER

Lawrence M. Swift, Tulsa, Okla., assignor to Engineering Laboratories, Incorporated, Tulsa, Okla., a corporation of Oklahoma Application February 24, 1942, Serial No. 432,143

1 Claim. (Cl. 234—1.5)

This invention relates to automatic recorders and more particularly to an apparatus adapted to rapidly and accurately record, simultaneously, a plurality of measurements.

Recorders have heretofore been constructed that would record a series of measurements on the same recording sheet but all have been extremely complicated and very difficult to build and keep in adjustment. Most of these recorders have utilized a single meter or galvanometer and connected this single meter or galvanometer, sequentially, into a plurality of input circuits. This necessitates the rapid switching of what are often minute currents, causes the galvanometer to move throughout its range rapidly and almost constantly and necessitates a repeated, complicated moving of the marking stylus of the recorder.

The present invention provides a relatively simple, sturdy, easily accessible recorder with a minimum of moving parts and switches. For that reason, it is easy to construct, fast, reliable in operation and accurate.

Basically, the recorder of this invention comprises a plurality of measuring instruments, preferably galvanometers, arranged so that indications of their measurements are all projected onto a common locus. A photocell is then arranged to continuously move back and forth across this locus and with it a marking device is caused to move back and forth across the recording surface. Then, as the photocell senses the crossing of one of the indications from one of the measuring instruments, the marking device is caused to make a mark on the recording surface. Thus, each time the photocell moves the length of the locus, a record is made of the indication of each of the measuring instruments.

The apparatus of this invention preferably incorporates several additional features, such as an arrangement of the light source which causes the light from the measuring instrument to reach the locus in an elongated cross-sectional form which extends across the locus, thus making it easy to detect with the photocell and capable of giving a sharp, accurate indication. This elongated cross-sectional beam also makes it possible to place a transparent scale just above the photocell so that the indications of the measuring instruments can be seen from the front of the recorder.

Another detailed feature of novelty is the mounting of the recording table on a pivot slightly above the recording stylus. This permits the recording table to be swung forward for easy access without interfering with the recording stylus. A further feature is the manner in which the photocell is mounted on a reciprocable carriage with the recording stylus and its operating mechanism so that both may be reciprocated at the same time. There is also the feature of an adjustable slit which governs the action of the photocell and makes possible extremely fine and accurate measurements. Still further, the carriage for the photocell and marking mechanism is mounted on a track which includes conductive rails through which current to operate the marking mechanism is brought to the mechanism. The currents from the photocell are taken from the carriage through a flexible cable and a resiliently moved take-up wheel.

In addition to these features the marking mechanism is operated by a particular type of electrical circuit so that the stylus does not wipe across the recorder tape but merely makes the desired mark and is released.

All of these things cooperate to make the present recorder sturdy, trouble proof, accurate, and easily accessible for adjustment. Each is included in this invention but the invention is not limited to any one of them.

For a more complete understanding of the apparatus of this invention and its numerous details and advantages reference may be had to the accompanying drawings.

In the drawings:

Figure 8 is a circuit diagram of the recorder.

Figure 1:
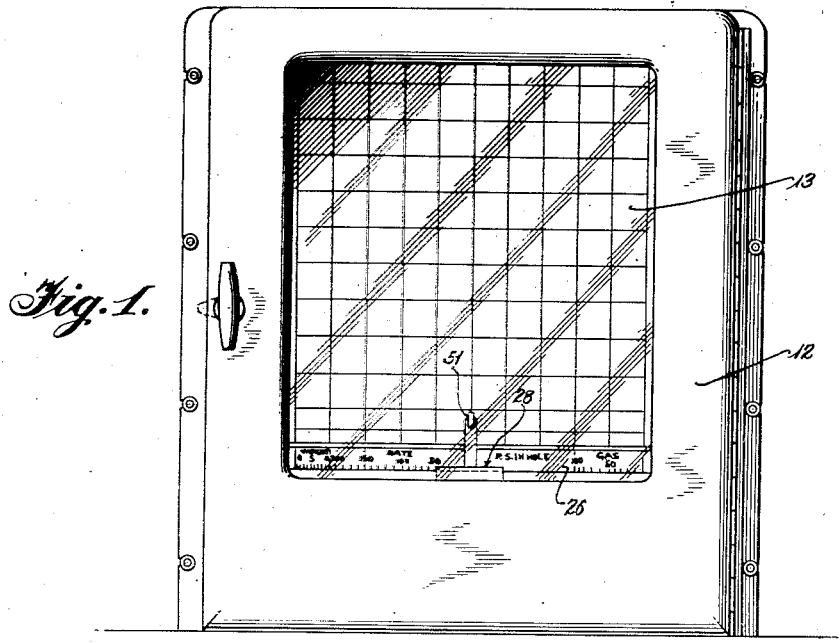
Figure 1 is a front elevation of a recording apparatus embodying the principles of this invention.
Figure 2:
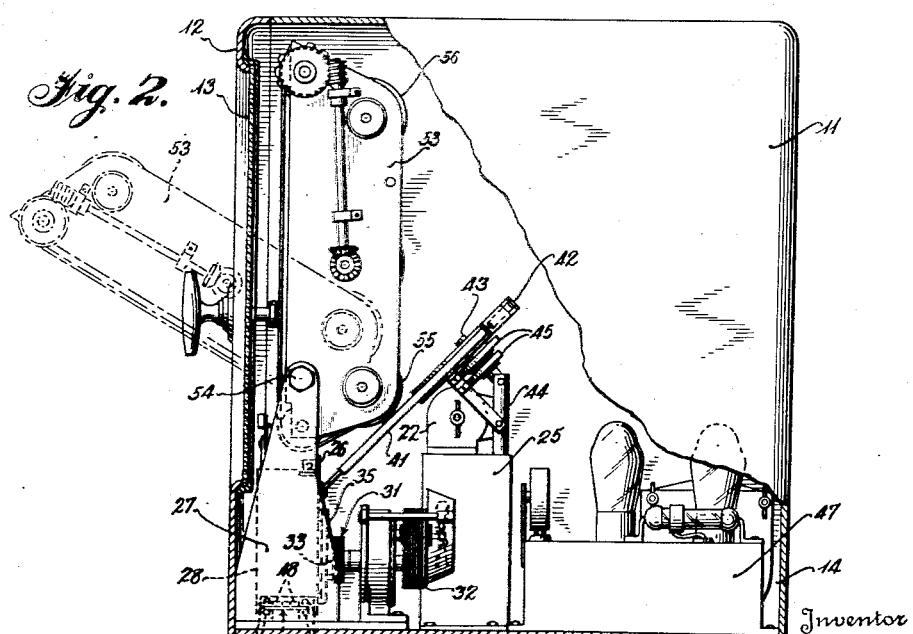
Figure 2 is a side elevation partly in section of the same apparatus.
Figure 3:
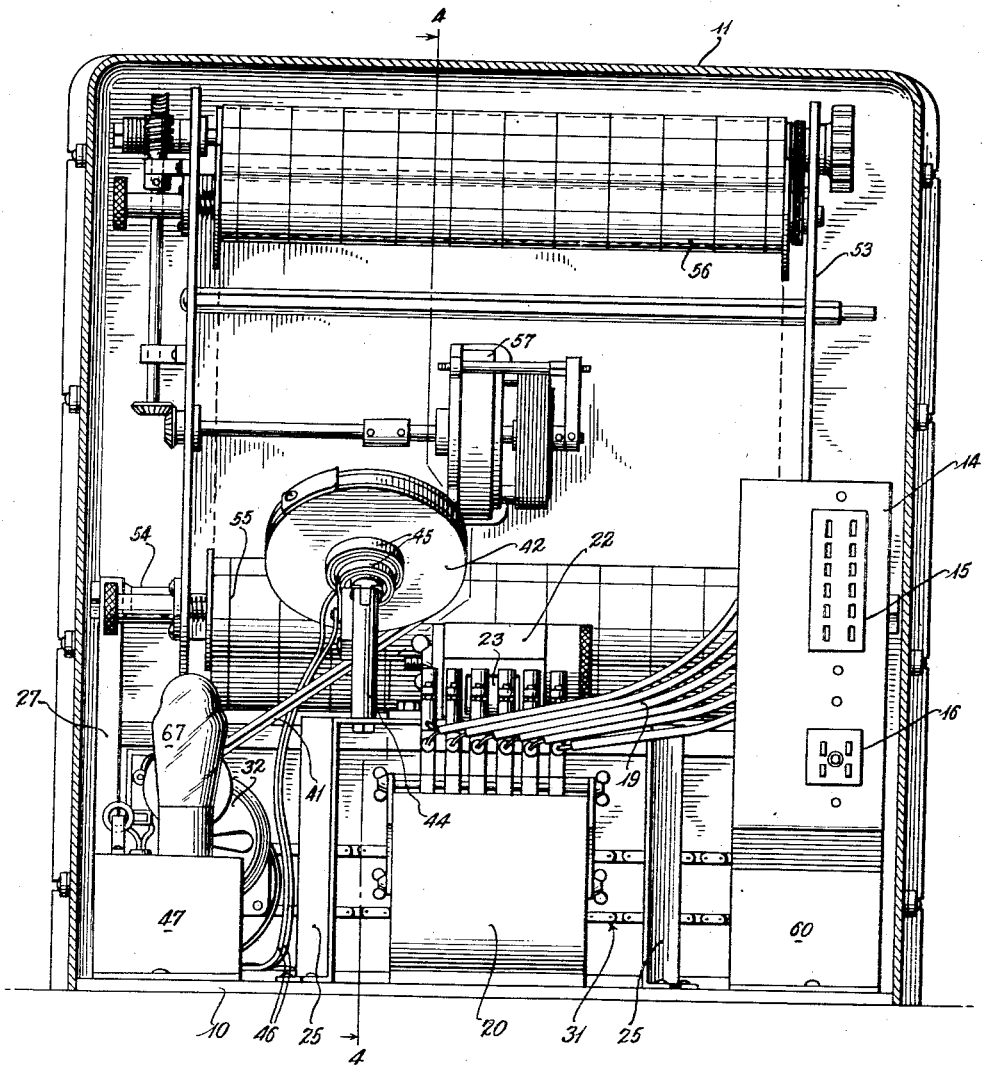
Figure 3 is a rear elevation of the same apparatus with the case sectioned to reveal the internal parts.
Figure 4:
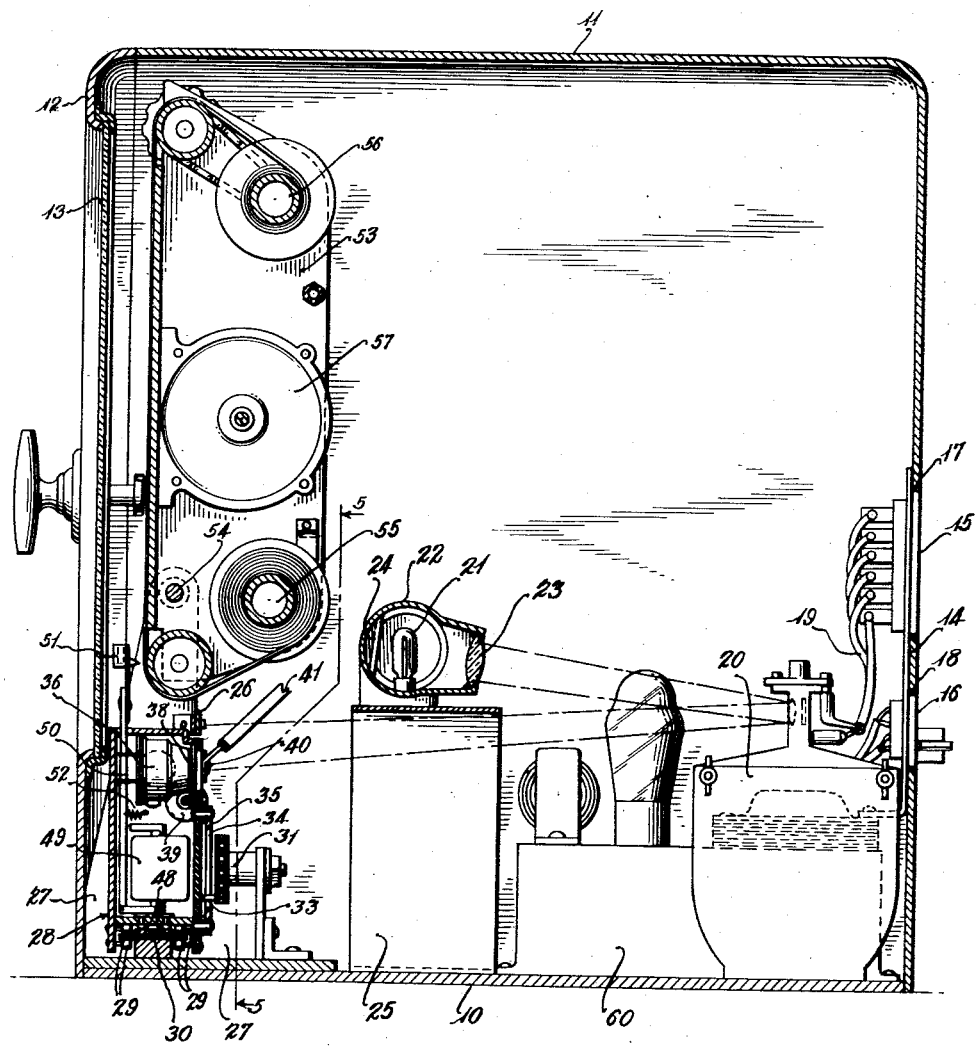
Figure 4 is a side sectional elevation of the same apparatus taken on line 4—4 of Figure 3.

The recorder illustrated is mounted on a base 10 and enclosed in a case generally designated 11. This case has a hinged front portion 12 which may be opened to give access to the recording tape, stylus and other internal parts. The hinged front contains a transparent window 13 through which the operation of the instrument may be observed.

At the rear of the base 10 is mounted an upstanding plate 14 which carries a multiple socket connection 15 and a multiple plug connection 16. The multiple socket connection is shown in the drawing as having six pairs of connections, which are used to receive into the recorder the signal currents the magnitudes of which are to be recorded. Obviously, any measurement that is to be recorded can be converted into a signal current by appropriate equipment prior to its introduction into the recorder. The plug connection 16 is shown as having four connections which serve to receive motive power to drive the mechanism of the recorder as will be hereinafter described. The back of the case is cut away at 17 and 18 to give access to the socket 15 and the plug 16.

Inside the case, the currents to be measured are conveyed directly, by a series of insulated wires 19, to the strings of a multiple galvanometer 20, each pair of contacts being connected to the opposite ends of one of the strings, in the usual manner. The multiple galvanometer is of the type often used in seismic surveying, and comprises a series of galvanometer wires or strings, each carrying a tiny mirror and suspended between the poles of a relatively powerful magnet. As a current passes through one of these wires or strings it is deflected and the mirror it carries moved to an extent dependent upon the magnitude of the current. Since galvanometers of this general type are quite well known they will not be further described.

Light for the galvanometer mirrors is supplied by a small electric lamp 21 mounted in a housing 22. In order to cause the light reflected from the galvanometer mirrors to have a vertically elongated cross-section the lamp 21 has a vertical filament and the vertical cross-section of the emitted light beam is accentuated by providing a cylindrical lens 23, which is curved in a vertical direction but not in a lateral direction, in the front of the housing. A mirror 24 may be provided behind the lamp. The lamp housing is mounted on a bracket 25 which in turn is mounted on the base 10.

Light from the lamp 21 passes through the lens 23, is reflected from the several mirrors of the multiple galvanometer 20 back through the bracket 25 which supports the lamp housing and onto the scanning mechanism and also onto a scale 26 positioned just above the scanning mechanism. There are two arms 27 which extend upwardly from the base plate near the front edge of the machine, to hold the recording table and other parts and the scale 26 is suspended from these arms by means of small brackets. By placing the transparent scale in the same plane as the photocell aperture, to be described, the indications thereon will exactly correspond to those that are to appear on the recording surface.

The scanning mechanism consists of a box-like carriage 28 mounted by means of rollers 29 on a laterally extending track 30, so that it can roll back and forth from one side to the other of the recording apparatus. The track 30 is mounted on the base 10. When the device is in operation the carriage is continuously reciprocated by means of a chain and sprocket arrangement 31, appropriately supported from the base 10 and driven by a synchronous electrical motor 32. The chain of the chain and sprocket arrangement 31 carries a small pin 33 which rides in a slot 34 in a bar 35, which bar is screwed to the carriage 28 at its opposite ends. Thus as the chain and sprocket arrangement is driven and pin 33 passes around the sprocket with the chain, the carriage 28 is regularly reciprocated from one end to the other of its track.

Figure 5:
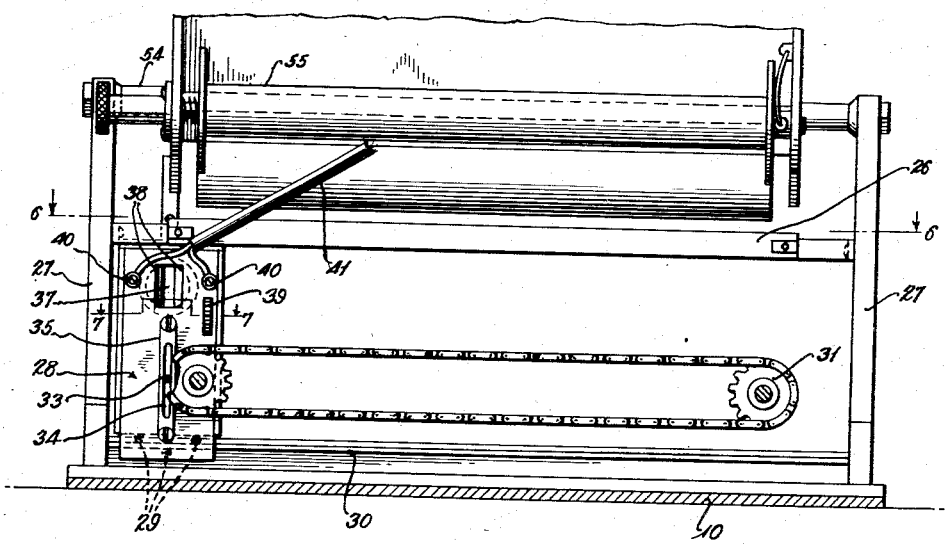
Figure 5 is a detail view in rear sectional elevation of the same apparatus taken along line 5—5 of Figure 3.
Figure 6:
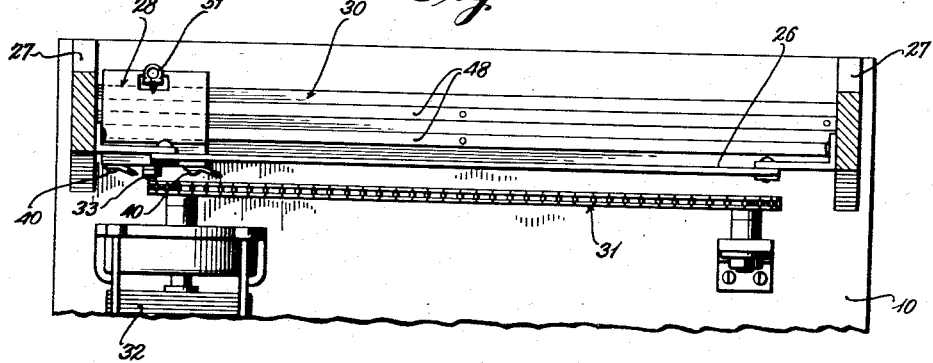
Figure 6 is a detail view in top plan taken along line 6—6 of Figure 5.
Figure 7:
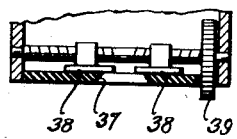
Figure 7 is a detail top sectional view taken along line 7—7 of Figure 5.

Within the carriage 28 is positioned a photocell 36 and an adjustable slit arrangement, shown in Figures 5 and 7, is built into the rear wall of the carriage 28 so that the amount of light reaching the photocell may be adjusted. This adjustable slit arrangement consists of a vertically elongated opening 37 in the rear wall of the carriage and a pair of vertical shutters 38 positioned behind the opening 3 and arranged so that they can be adjusted by a thumbscrew 39 to close the opening, laterally, to any desired extent. Thus the slit can be made of any desired width and the fineness of the recording thereby adjusted.

Connections from the photocell 36 pass from the movable unit 28 through connections 40 and a flexible cable 41 to a cable reel or wheel 42 rotatably mounted on a spindle 43 which is supported by an arm 44 from the bracket 25. The cable reel 42 is resiliently urged to rotate in a direction that will take up the slack in the flexible cable 41 by a pair of spiral springs 45 which are insulated from each other and serve as connectors between the conductors in the cable 41 and conductors 46 which are connected to an amplifier 47.

The output of the amplifier 47 is connected through connections, shown only in the circuit diagram of Figure 8, to a pair of conductive rails 48 mounted on the track which supports the movable carriage, but insulated therefrom and from each other. From these rails the output current of the amplifier is connected through brushes in the bottom of the movable carriage to a solenoid 49 in the carriage, which solenoid operates an armature 50 which carries at its upper end a marking stylus 51 adapted to contact the paper on the recording table when the solenoid is energized. A spring 52 normally urges the armature away from the paper and the solenoid, upon actuation, brings the armature and the stylus toward the paper.

The recording paper is carried by a recording table 53 which is pivotally mounted in the supporting arms 27 at 54 which is above the stylus but below the center of the recording table. A recording paper is fed from a roll 55, behind and at the lower end of the recording table, over the face of the recording table and onto a roller 56 at the upper end and behind the recording table. The paper is moved along the recording table by a synchronous electric motor 57 through the usual driving connections.

By reason of the peculiar mounting of the recording table, the front of the recording instrument may be opened, the table tilted forward and access thus had to the rolls, from which the recording paper is unrolled and onto which it is rolled after being used. This greatly facilitates the changing of paper. At the same time it gives access to the internal parts of the device without removing the entire case.

As has already been explained the currents to be measured are conducted directly to the strings of the galvanometer. The operating currents pursue a somewhat more devious path, however, and hence it may be well to trace them through the circuit diagram of Figure 8.

Current for the motor 57 which moves the recording paper may be brought into the recorder through one of the pairs of contacts of the plug 16 and controlled by the switch 58, which has not been shown in the drawings of the apparatus, but which may be positioned at any place on the case, or otherwise, that is found convenient.

Current for the other parts of the recorder may be brought in through the same pair of contacts, if the same voltage and frequency is to be used, or, alternatively, may be brought in through the other pair of contacts as shown in Figure 8, if a different voltage or frequency is to be used. This current may be controlled by a switch 59, which like the switch 58 has not been shown in the detailed drawings but which may be positioned anywhere convenient. The motor 32 which drives the reciprocable carriage may be connected to receive its current directly from this source. A power supply unit 60 may also receive its supply current directly from this source.

The reason for showing separate connections for the chart driving motor is that it may be desirable to govern the speed of the chart driving motor in accordance with some outside factor such as the passage of time, the progress of a product past the measuring instruments, the rate of lowering of a well surveying instrument in a drill hole, or the like. Any of these things can easily be used to control the movement of the chart if so desired.

In the power supply unit there may be positioned a small transformer 61 to supply power to the lamp 21 and a second transformer 62, operating in conjunction with the usual rectifier tube 63, condensers, chokes and the like to supply operating current to the photocell circuit.

The photocell circuit 47 is of novel construction. Voltage from the power supply is applied through a resistor 64 across a voltage regulator tube 65 and also across a circuit consisting of the photocell 36 and a resistor 66. Thus the voltage across the photocell is carefully kept constant, except as affected by the changes in the photocell itself.

One of the grids of a Thyratron tube 67 is connected to this circuit between the photocell 36 and the resistor 66 in such a manner that the Thyratron tube is tripped by the reduction of the resistance of the photocell that is caused when light strikes the photocell. The plate of the Thyratron tube is connected through the solenoid 49 which operates in the marking stylus and through a resistor 68 to the power pack. The screen grid of the Thyratron tube is connected to its cathode and the cathode is given the desired potential by connecting it to the slider of a potentiometer 69 which is connected across the output of the power pack. A condenser 70 is connected between the screen grid and the resistor 68.

With this circuit, actuation of the photocell causes an increase in the voltage on the control grid, thus causing current to pass through the Thyratron tube and operate the marking device. At this time, however, the condenser 70 discharges through the Thyratron tube and the potentials of the screen grid and plate fall to a sufficiently low voltage to stop the flow of current through the tube. Thus the marking stylus is immediately released and will not be again operated until sufficient time has elapsed for the condenser 70 to again become charged from the power supply, through the resistor 68. By properly proportioning the condenser and resistance this period may be made sufficiently long so that the photocell slit will have passed beyond the light beam which actuated it. Thus the marking device will make a single sharp mark for each indication and all tendency toward the wiping of the marking stylus across the record surface will be eliminated.

I claim:

Apparatus for recording simultaneously on a single record sheet a plurality of measurements comprising a source of light in fixed position, a plurality of fixedly positioned galvanometers each of which is responsive to an independent source of energy and each of which includes a mirror which is rotatable in response to electrical signals, the angular displacement of the mirrors being proportional to the intensity of the source of energy, each of said mirrors receiving light from said source of light and reflecting a beam in a direction dependent upon the instantaneous position of the mirror, the reflected beams from all the mirrors of said galvanometer being in substantially the same plane, and the field of the projected beam from each mirror being displaced from the field of the projected beam from the other mirrors so that the beams do not overlap, a carriage, a photoelectric means carried by said carriage, means for moving the carriage continuously back and forth at a uniform rate so that the photoelectric means is moved back and forth along the line of said beams of light and continuously and repeatedly scans the beams and produces electrical current upon the interception of a beam, the record sheet being moved at right angles to the direction of movement of the carriage, a marking means carried by said carriage in a position to make a mark on the record sheet when the marking means is energized, said marking means being energized in response to the generation of said electrical currents by said photoelectric means, and thereby producing marks on the record sheet that are representative of the angular position of each of the mirrors at the instant at which the photoelectric means intercepts a beam.

LAWRENCE M. SWIFT.